United States Patent
Tsai

(10) Patent No.: US 7,773,203 B2
(45) Date of Patent: Aug. 10, 2010

(54) LASER DISTANCE-MEASURING APPARATUS AND CONTROL METHODS THEREOF

(75) Inventor: Tsung-Yueh Tsai, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 54 days.

(21) Appl. No.: 12/367,629

(22) Filed: Feb. 9, 2009

(65) Prior Publication Data

US 2010/0123894 A1 May 20, 2010

(30) Foreign Application Priority Data

Nov. 19, 2008 (TW) ............................... 097144750

(51) Int. Cl.
*G01C 3/08* (2006.01)
(52) U.S. Cl. ..................... 356/4.07; 356/4.01; 356/5.01
(58) Field of Classification Search ................ 356/4.01, 356/4.07, 5.01, 5.1, 5.15
See application file for complete search history.

(56) References Cited

U.S. PATENT DOCUMENTS

| 5,625,447 | A | * | 4/1997 | Kikuchi et al. ............. 356/4.01 |
| 5,949,531 | A | | 9/1999 | Ehbets et al. |
| 6,122,040 | A | * | 9/2000 | Arita et al. ................. 356/4.01 |
| 7,158,218 | B2 | * | 1/2007 | Arita et al. ................. 356/4.01 |
| 7,167,235 | B2 | * | 1/2007 | Kikuchi ..................... 356/4.01 |
| 7,304,602 | B2 | * | 12/2007 | Shinagawa et al. .......... 342/174 |
| 7,403,269 | B2 | * | 7/2008 | Yamashita et al. ......... 356/5.01 |
| 7,589,826 | B2 | * | 9/2009 | Mack et al. ................ 356/5.01 |
| 2003/0043363 | A1 | * | 3/2003 | Jamieson et al. ........... 356/5.01 |

* cited by examiner

*Primary Examiner*—Isam Alsomiri
(74) *Attorney, Agent, or Firm*—Thomas, Kayden, Horstemeyer & Risley

(57) ABSTRACT

A distance-measuring apparatus is disclosed. The distance-measuring apparatus includes: an emitter, emitting a light to be measured toward a target, a receiver, receiving a reflected emitted light; a reflector, reflecting the emitted light to the receiver; a condensing lens, condensing the reflected emitted light, reflected by the target to the reflector; a driving module, adjusting the inclination angle of the reflector; and a control unit, controlling the driving module to rotate according to a result of comparing the intensity of the emitted light received by the receiver and a predetermined value.

17 Claims, 6 Drawing Sheets

LASER DISTANCE-MEASURING APPARATUS AND CONTROL METHODS THEREOF

This application claims the benefit of Taiwan Application No. 097144750, filed Nov. 19, 2008.

BACKGROUND OF THE INVENTION

1. Field of the Invention

The present invention relates to a laser distance-measuring apparatus and control methods thereof.

2. Description of the Related Art

Conventional laser distance-measuring apparatuses comprise an optical system to measure distance. However, most conventional optical distance measuring systems have a limited short-range cut off point. Specifically, most conventional optical distance measuring systems are limited to measuring distance ranges of over 0.3 meters. Thus, if the target to be measured is located under 0.3 meters, the reflected emitted light incident angle from the target will be too large, so that the receiver will not be able to appropriately receive the reflected emitted light and thus the target distance can not be calculated.

U.S. Pat. No. 5,949,531 discloses a distance-measuring apparatus in which a receiver is attached on one end of a leafspring, while the opposite end is fixed onto the body of the distance-measuring apparatus. A cam under the leafspring is rotated, so that the position of the receiver is changed according to the rotating cam. While the invention makes it capable for a laser distance-measuring apparatus to measure short-ranged distances, due to the leafspring and the cam, the distance-measuring apparatus requires a large volume, which is inconvenient for users. Additionally, during usage, due to the position of the leafspring and the cam, the rotating mechanism may easily wear out or be defective, wherein the receiver is positioned with a deviation.

BRIEF SUMMARY OF THE INVENTION

An exemplary example of the distance-measuring apparatus comprises: an emitter, emitting a light to be measured toward a target; a receiver, receiving a reflected emitted light; a reflector, reflecting the emitted light to the receiver; a condensing lens, condensing the reflected emitted light, reflected by the target to the reflector; a driving module, adjusting the inclination angle of the reflector; and a control unit, controlling the driving module to rotate according to a result of comparing the intensity of the emitted light received by the receiver and a predetermined value.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
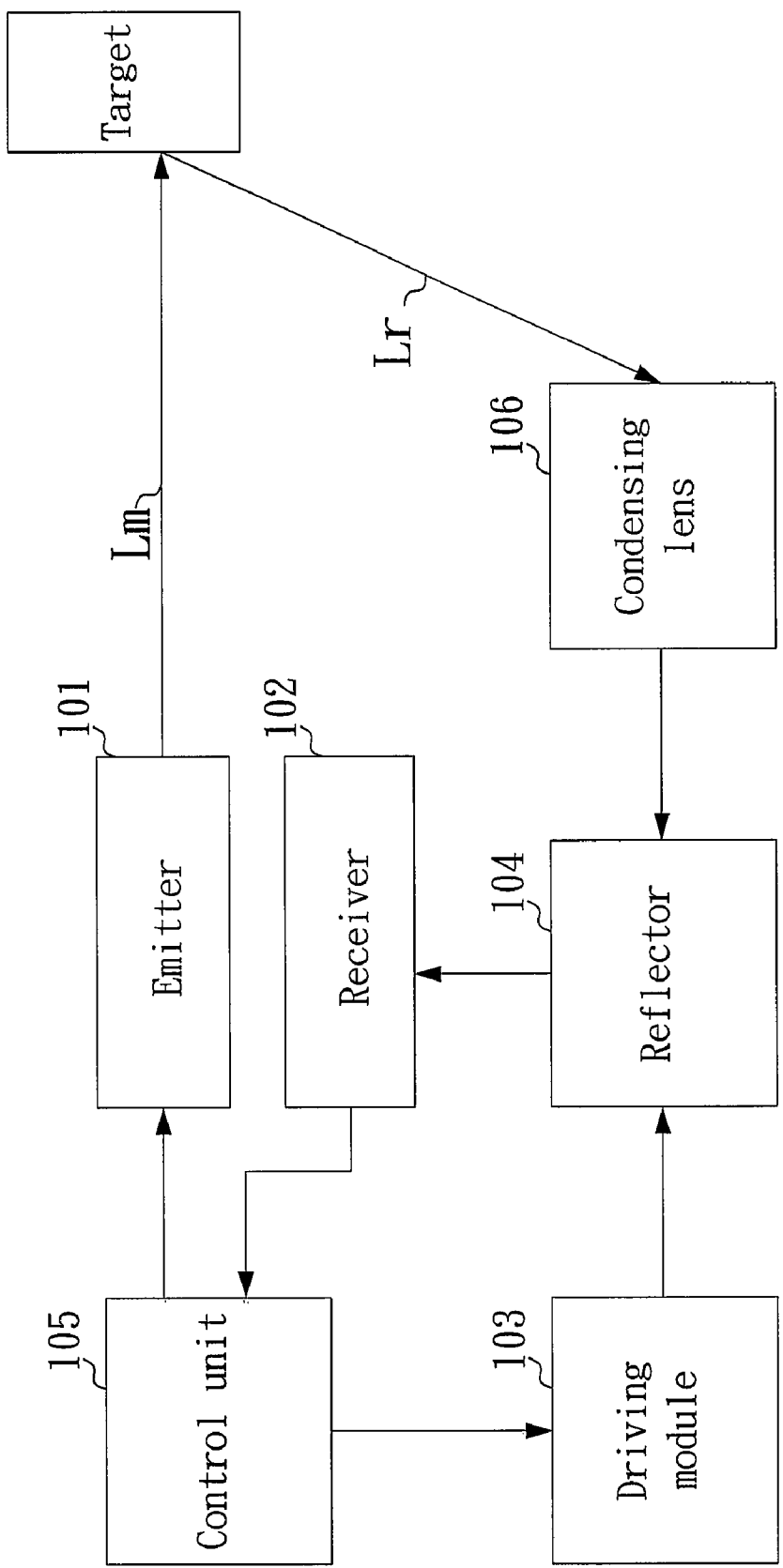
FIG. 1 is a schematic drawing of an embodiment of the laser distance-measuring apparatus of the invention.

FIG. 1 is a schematic drawing of an embodiment of the laser distance-measuring apparatus of the invention. The distance-measuring apparatus comprises an emitter 101, a receiver 102, a driving module 103, a reflector 104, a control unit 105, and a condensing lens 106.

The emitter 101 is used to emit a light to be measured Lm toward a target. In the embodiment, the emitter 101 is a laser module and the laser module emits a light to be measured Lm toward the target. When the laser distance-measuring apparatus measures a distance from a target, a light to be measured Lm will be reflected from the target as a reflected emitted light Lr after the light to be measured Lm arrives at the target.

The condensing lens 106 is used to condense the reflected emitted light Lr which is reflected from the target, onto the reflector 104 onto the receiver 102. Further, the reflector 104 reflects and focuses the reflected emitted light Lr onto the sensing surface of the receiver 102. In the embodiment, the condensing lens 106 is a convex lens. In one embodiment, the condensing lens 106 is an aspherical lens.

The receiver 102 is used to receive the reflected emitted light Lr. In the embodiment, the receiver 102 is an avalanche photo diode (APD). the APD outputs an electronic signal, for example a voltage, corresponding to the intensity of the reflected emitted light Lr when receiving the reflected emitted light Lr, wherein the value of the voltage will be greater when the intensity of the reflected emitted light Lr sensed by the receiver 102 is greater. Oppositely, the value of the voltage will be lower when the intensity of the reflected emitted light Lr sensed by the receiver 102 is lower.

Figure 5:
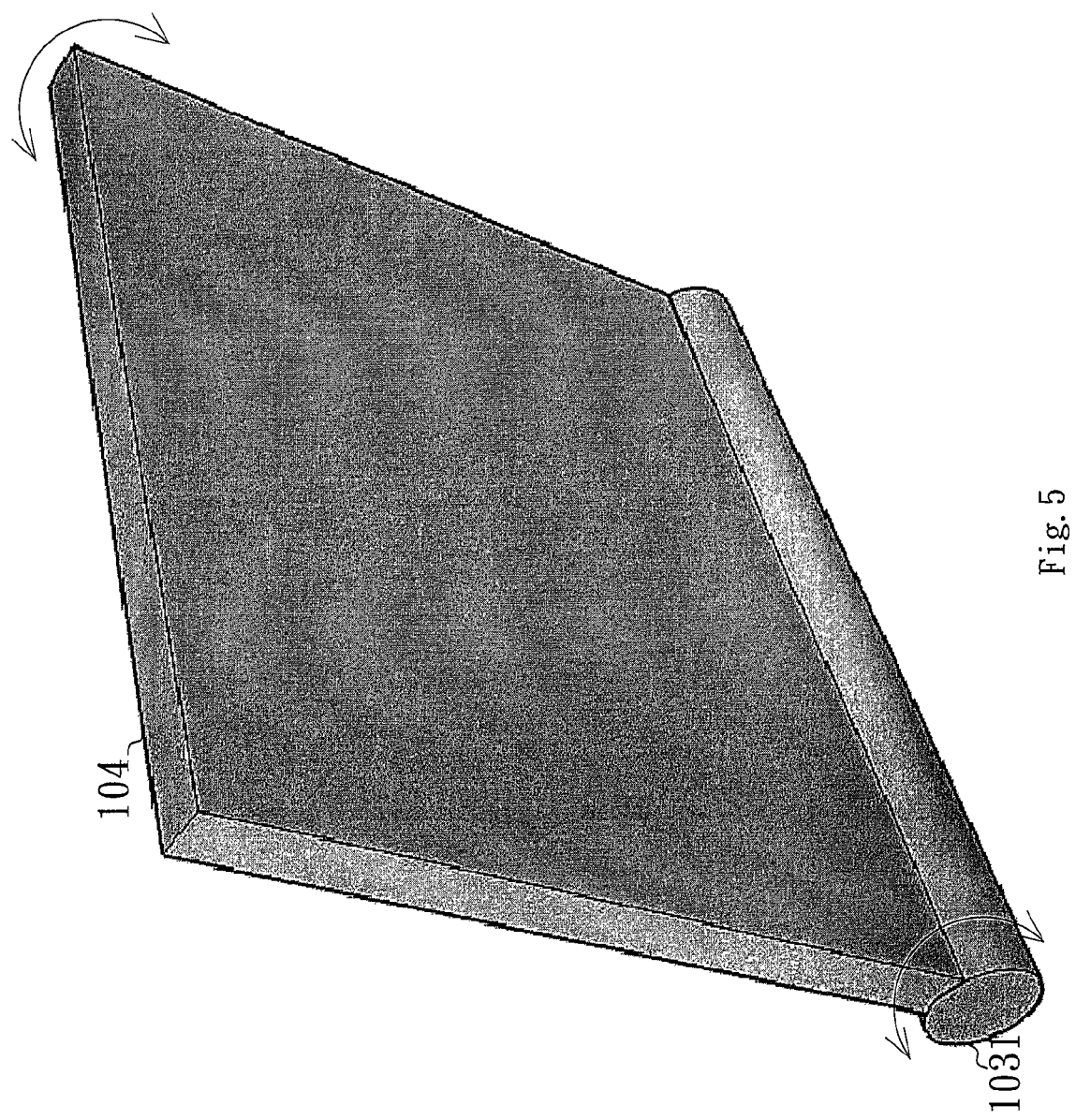
FIG. 5 illustrates a reflector configured on a shaft.

The reflector 104 is used to reflect the reflected emitted light Lr onto the receiver 102. In the embodiment, the reflector 104 is a mirror. In one embodiment, the reflector 104 is a prism. The reflector 104 reflects the reflected emitted light Lr through the condensing lens onto the receiver 102, so that the receiver 102 can receive the reflected emitted light Lr. The reflector 104 is fixed on a shaft of the driving module 103. As illustrated in FIG. 5, which illustrates the reflector 104 configured on a shaft. The reflector 104 is configured on the shaft 1031 of the driving module 103, so that the reflector 104 can be adjusted with an inclination angle according to rotation of the shaft 1031 of the driving module.

The driving module 103 is used to adjust the inclination angle of the reflector 104. The driving module 103 is rotated with fixed angles according to a rotate signal, wherein the rotate signal includes a C.W rotate signal and a C.C.W rotate signal. In the embodiment, the driving module 103 is a stepping motor. In another embodiment, the driving module 103 is a servo motor. For example, when the stepping motor receives the C.W signal, the shaft 1031 of the driving module 103 will be rotated with a fixed angle. Meanwhile, when the C.W signal is received again by the stepping motor, the shaft 1031 of the driving module 103 will be rotated with a fixed angle and in the same direction. Additionally, when the C.W signal is continuously received by the stepping motor, the shaft 1031 of the driving module 103 will be continuously rotated with fixed angles and in the same direction until the C.W signal is ceased. On the contrary, when the stepping motor receives the C.C.W signal, the shaft 1031 of the driving module 103 will be rotated with a fixed angle in an opposite direction.

The control unit 105 controls the rotation of the driving module 103 according to the result of comparing the intensity of the light to be measured Lm received by receiver and a predetermined value. The electronic signal is converted to a digital signal following an analog to digital conversion procedure and is then outputted to the control unit 105. When the control unit 105 receives the digital signal, the value of the digital signal will be compared to a predetermined value. Once the value of the digital signal is smaller than the predetermined value, the control unit 105 will control to rotate via that the control unit 105 send the rotate signal to the driving module 103 so that the driving module 103 is rotated. The driving module 103 does not rotate until the value of the digital signal is higher than the predetermine value again. Should this occur, the rotate signal would be stopped. In the embodiment, the control unit 105 is a Micro Processor Unit (MCU). In another embodiment, the control unit 105 comprises a Digital Signal Processor (DSP), a Central Processor Unit (CPU), a Field Programmable Gate Array (FPGA), and a Complex Programmable Logic Device (CPLD). For example, the receiver 102 output a voltage, for example 2V, corresponding to the intensity of the light to be measured Lm received by the receiver 102 to the control unit 105 to be compared to the predetermined value, wherein the voltage is converted to a digital value after being outputted by the receiver 102. Once the value of the voltage is lower than the predetermined value, the rotate signal will be outputted to the driving signal 103 to control the driving module 103 to rotate.

Figure 2:
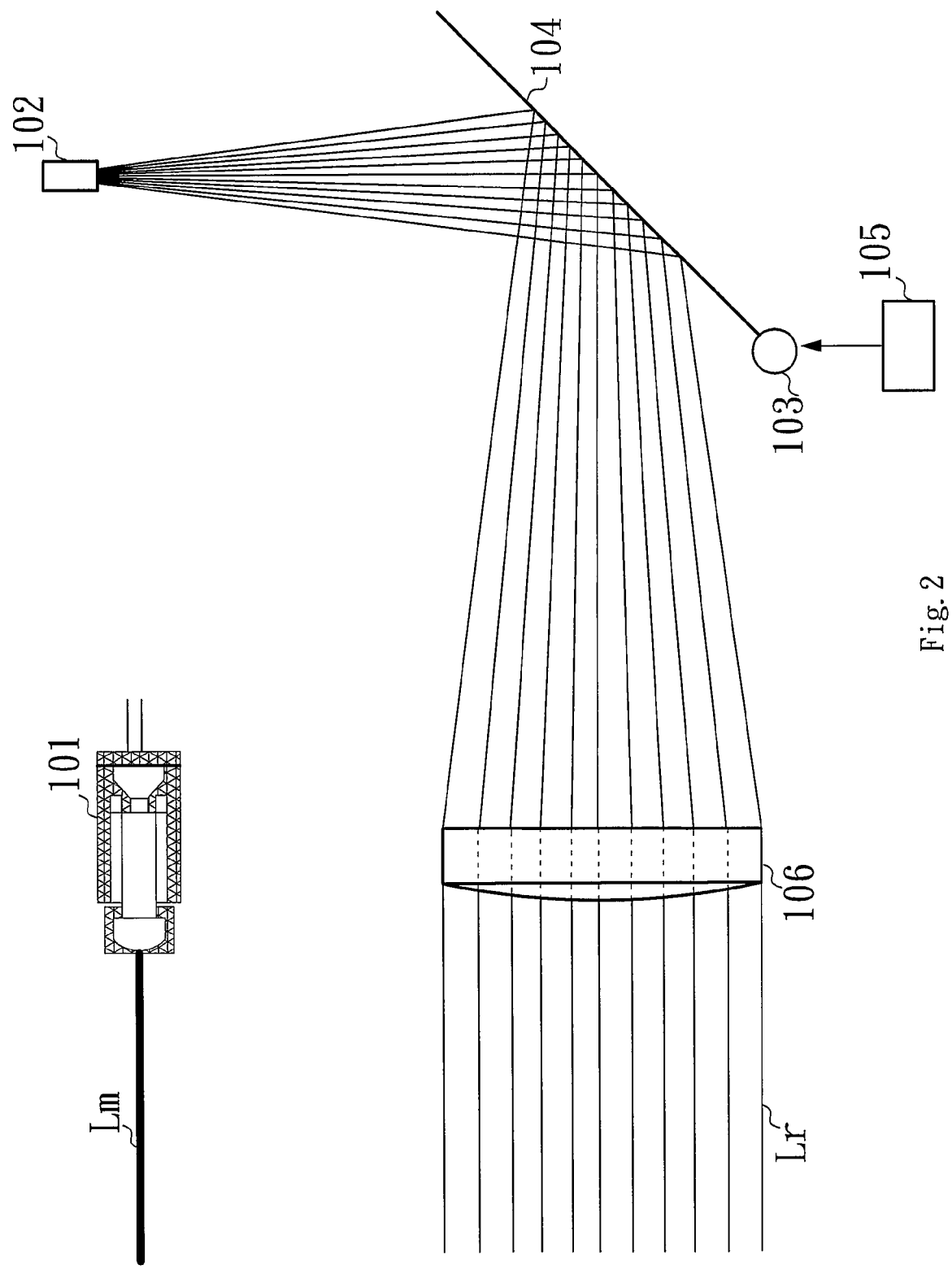
FIG. 2 is a schematic drawing of an embodiment of the laser distance-measuring apparatus of the invention measuring a long-ranged target.
Figure 3:
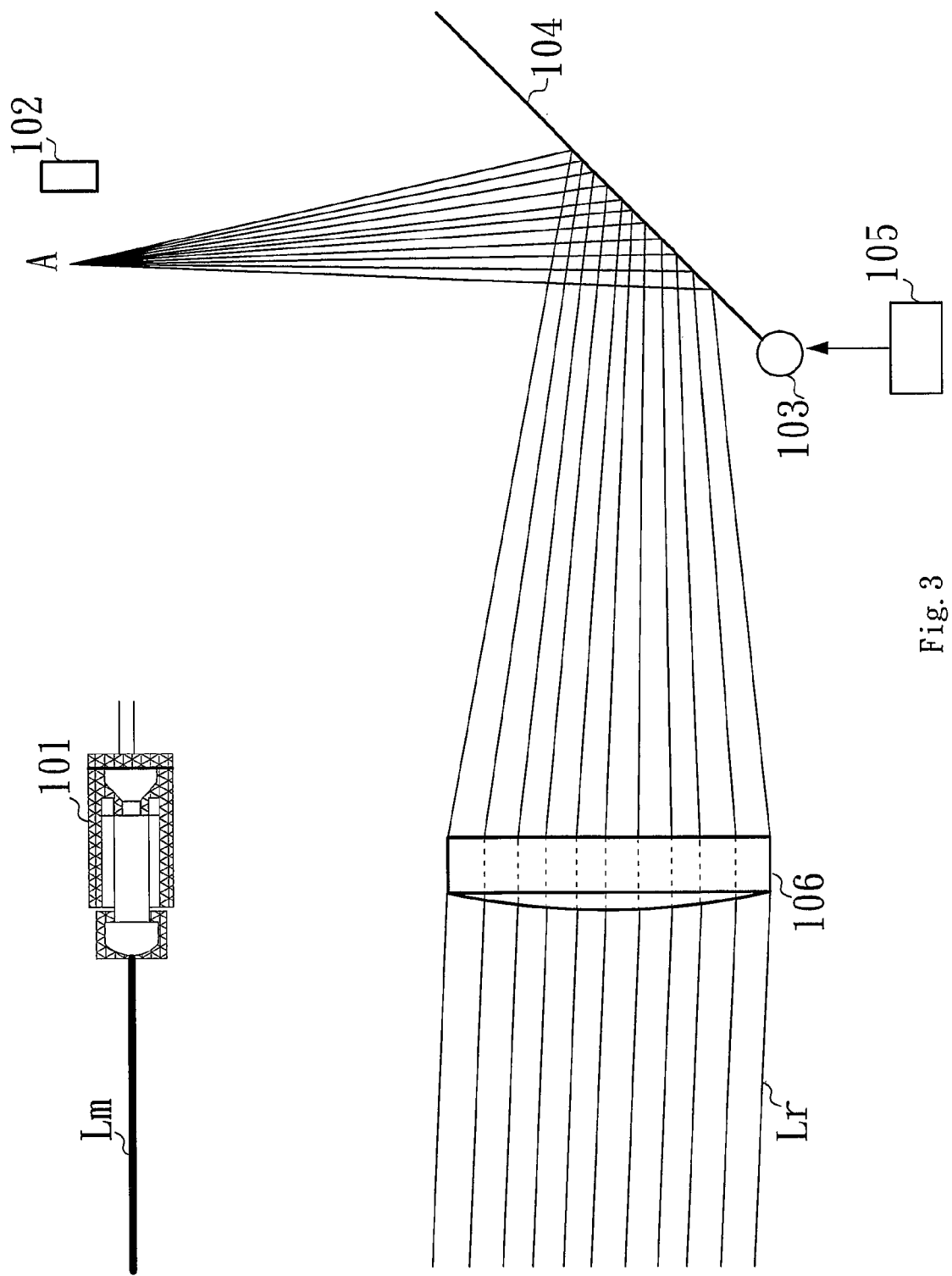
FIG. 3 is a schematic drawing of an embodiment of the laser distance-measuring apparatus of the invention measuring a short-ranged target.
Figure 4:
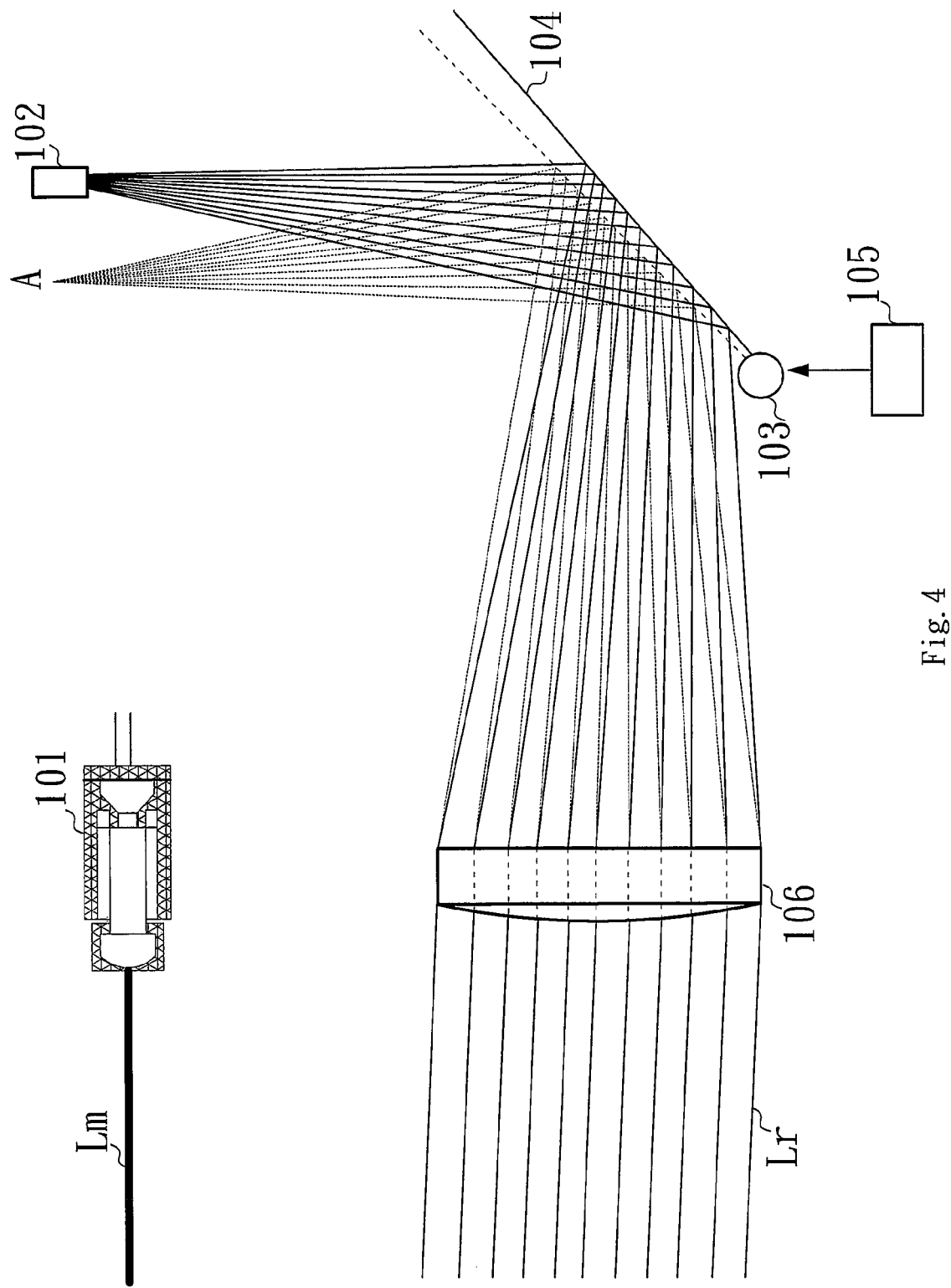
FIG. 4 illustrates an embodiment of a laser distance-measuring apparatus of the invention measuring a short-ranged target as the inclination angle of the reflector is adjusted to change the focus position on the receiver.

Please refer FIG. 2 to FIG. 4, which illustrates a laser distance-measuring apparatus of the invention measuring a target as the inclination angle of the reflector is adjusted to change the focus position on the receiver. Referring to FIG. 2, the emitter 101 emits a light to be measured Lm toward a long-ranged target, and the light to be measured Lm is reflected as the reflected emitted light Lr from the target. The reflected emitted light Lr is projected to the condensing lens 106. Because the target is a long-ranged target, the incidence angle is smaller than that of the target so that the reflected emitted light Lr is refracted with a smaller refraction angle. Therefore, the reflected angle is larger than that of a short-ranged target. The reflector 104 reflects the reflected emitted light Lr from the condensing lens 106 with an angle the same as incidence angle, so that the reflector 104 reflects most of the reflected emitted light Lr to the receiver 102. Because the receiver 102 receives most of the reflected emitted light Lr, the receiver outputs a higher voltage and the control unit 105 receives the higher voltage and compares it to a predetermined value. Since the voltage is higher than the predetermined value, the control unit 105 calculates the distance of the target.

FIG. 3 illustrates the laser distance-measuring apparatus of the invention measuring a short-ranged target. Referring to FIG. 3, the emitter 101 emits a light to be measured Lm toward a short-ranged target, and the light to be measured Lm is reflected as the reflected emitted light Lr from the target. The reflected emitted light Lr is projected to the condensing lens. Because the target is a short-ranged target, the incidence angle is bigger than that of the target so that the reflected emitted light Lr is refracted with a bigger refraction angle. Therefore, the reflected angle is smaller than that of a long-ranged target. Most of reflected emitted light Lr is focused at point A rather than the sensing surface of the receiver 102. At this time, the receiver 102 can not receive the reflected emitted light Lr, and a lower voltage is output. The control unit 105 compares the voltage with the predetermined value and determines that it is lower than the predetermined value. Following, the control unit 105 sends a rotate signal to the driving module 103 in order to control the driving module 103 to rotate. At this time, the inclination angle of the reflector 104 attached on the shaft is changed by rotating the shaft of the driving module 103. The process is continued until the control unit 105 determines that the voltage is larger than the predetermined value.

Please refer to FIG. 4. FIG. 4 illustrates an embodiment of a laser distance-measuring apparatus of the invention measuring a short-ranged target as the inclination angle of the reflector is adjusted to change the focus position on the receiver. Because the focus position to the receiver 102 has been adjusted, the receiver 102 receives most of the reflected emitted light Lr. Thus, a higher voltage is outputted, increasing the value of the voltage to be greater than the predetermined value. Following, the shaft of the driving module 103 is stopped, and a distance is calculated.

Figure 6:
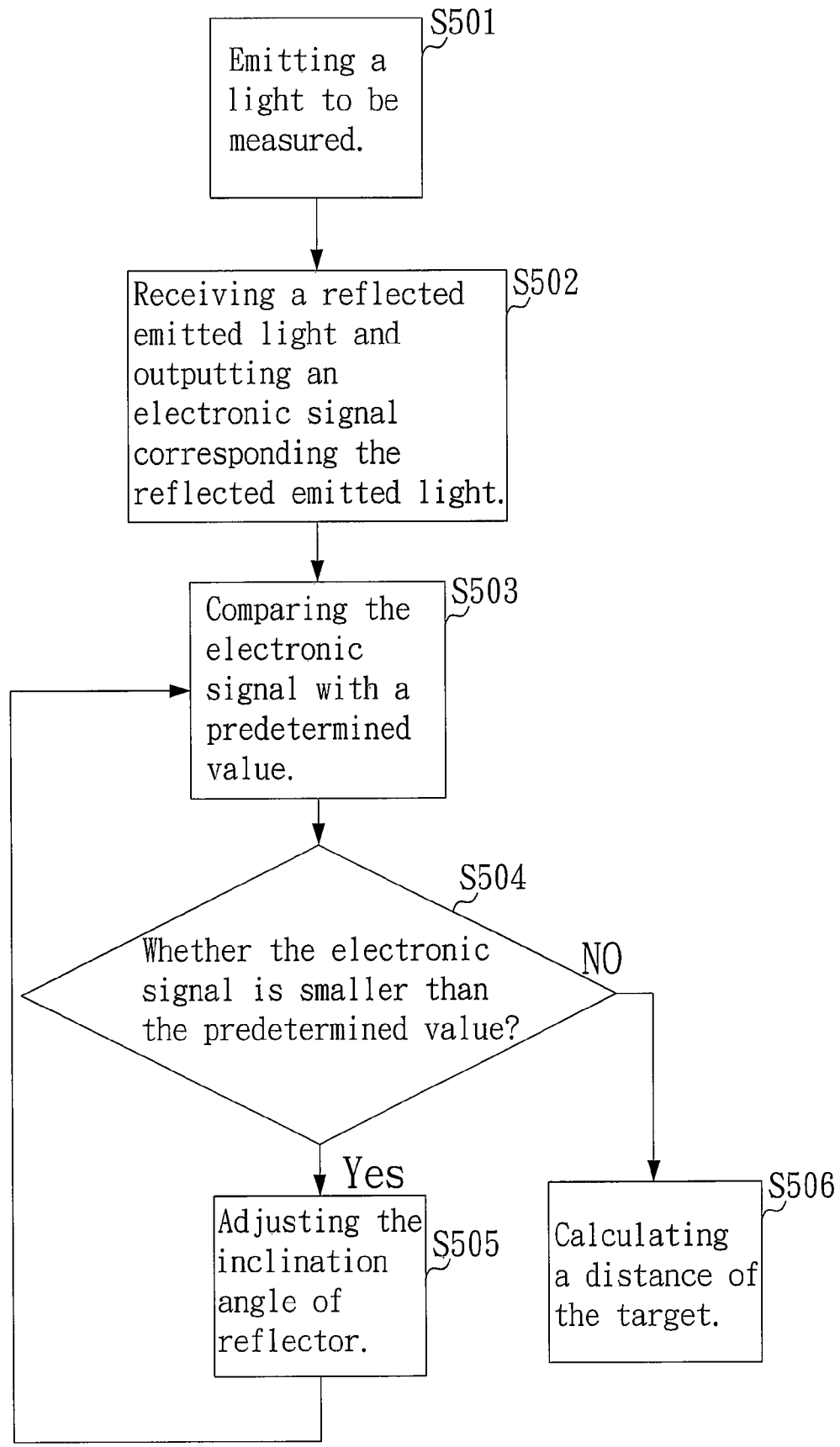
FIG. 6 illustrates a flow chart of an embodiment of a control method for a laser distance-measuring apparatus of the invention.

Please refer FIG. 6, which illustrates a flow chart of an embodiment of a control method for a laser distance-measuring apparatus of the invention, wherein the laser distance-measuring apparatus comprises an emitter 101, a receiver 102, a driving module 103, a reflector 104, a control unit 105, and a condensing lens 106, and the control method comprises the following steps.

In step S501, the emitter 101 emits a light to be measured Lm toward to target.

In step S502, the reflected emitted light Lr, which is reflected from the target and through the condensing lens, is received and condensed on the reflector 104. Thereafter, the reflected emitted light Lr is focused on the receiver 102, wherein an electronic signal corresponding to the intensity of the reflected emitted light Lr is outputted from the receiver 102.

In step S503, the control unit 105 receives a value of the electronic signal and compares it to a predetermined value to obtain a result.

In step S504, the control unit 105 determines whether the electronic signal is smaller than the predetermined value. If yes, the steps move to step S505; If not, the steps move to step S506.

In step S505, the inclination angle of the reflector is adjusted, wherein the control unit 105 sends the rotate signal to the driving module 103, and the driving module 103 receives the rotate signal and starts to rotate, so that the inclination angle of the reflector is adjusted corresponding to the rotating shaft of the driving module 103. Following, the steps return to step S503, wherein the control unit 105 continuously compares the electronic signal and the predetermined value.

In step S506, the distance of the target is calculated, wherein, the control unit 105 calculates a distance of the target according to the electronic signal. received by the receiver 102.

The laser distance-measuring apparatus and control method thereof of the present invention utilizes the receiver 102 to sense the reflected emitted light Lr. The receiver 102 outputs the electronic signal corresponding to the intensity of the reflected emitted light Lr. When the electronic signal is smaller than the predetermined value, the target is considered to be within a shorter range. When the target is considered to be within a shorter range, the control unit 105 will control the driving module 103 to rotate and adjust the inclination angle of the reflector 104, thus changing the path of the reflected emitted light Lr. Thus, when the receiver 102 again senses the reflected emitted light Lr, the control unit 105 will control the driving module 103 to stop rotating the driving module 103 and the inclination angle of the reflector 104 will be fixed to reflect the reflected emitted light Lr from the target from a short range, so that the distance can be calculated.

Thus, the laser distance-measuring apparatus and control method thereof of the present invention makes it capable for a laser distance-measuring apparatus to measure long-ranged and short-ranged distances with a smaller volume, offering more convenience for users. Additionally, due to the driving module being used to adjust the inclination angle of the reflector, problems such as wearing out or defect of a rotating mechanism are mitigated, allowing for more consistent and accurate receiver positioning when compared to conventional laser distance-measuring apparatuses.

What is claimed is:

1. A laser distance-measuring apparatus, comprising
   an emitter, emitting a light to be measured toward a target;
   a receiver, receiving a reflected emitted light;
   a reflector, reflecting the emitted light to the receiver;
   a condensing lens, condensing the reflected emitted light, reflected by the target to the reflector;
   a driving module, adjusting the inclination angle of the reflector; and
   a control unit, controlling the driving module to rotate according to a result of comparing the intensity of the emitted light received by the receiver and a predetermined value.

2. The laser distance-measuring apparatus as claimed in claim 1, further comprising the receiver, outputting an electronic signal corresponding to the intensity of the reflected emitted light and the control unit, controlling the driving module to rotate when the electronic signal is smaller than the predetermined value.

3. The laser distance-measuring apparatus as claimed in claim 2, further comprising the control unit, controlling the driving module to rotate until the electronic signal is higher than the predetermined value.

4. The laser distance-measuring apparatus as claimed in claim 1, wherein the condensing lens is a convex lens or aspherical lens.

5. The laser distance-measuring apparatus as claimed in claim 1, wherein the emitter is a laser module.

6. The laser distance-measuring apparatus as claimed in claim 1, wherein the receiver is an avalanche photo diode (APD).

7. The laser distance-measuring apparatus as claimed in claim 1, wherein the reflector is a mirror or a prism.

8. The laser distance-measuring apparatus as claimed in claim 1, wherein the reflector is fixed onto the shaft of the driving module.

9. The laser distance-measuring apparatus as claimed in claim 1, wherein the driving module is a motor.

10. The laser distance-measuring apparatus as claimed in claim 9, wherein the motor is a servo motor or stepping motor.

11. A control method for a laser distance-measuring apparatus, wherein the laser distance-measuring apparatus comprises an emitter, a receiver, a driving module, a reflector, a control unit, and a condensing lens, comprising the steps of:
    emitting a light to be measured;
    receiving a reflected emitted light and outputting an electronic signal corresponding to the intensity of the reflected emitted light, wherein the reflected emitted light is reflected by the target;
    comparing the electronic signal with a predetermined value; and
    when the electronic signal is smaller than the predetermined value, adjusting the inclination angle of the reflector to change the path of the reflected emitted light.

12. The method as claimed in claim 11, wherein the light to be measured is emitted by an emitter.

13. The method as claimed in claim 11, wherein receiving the reflected emitted light and outputting an electronic signal corresponding to the reflected emitted light further comprises the reflected emitted light being focused onto the receiver by the condensing lens and the reflector, and the receiver outputting the electronic signal corresponding to the intensity of the reflected emitted light.

14. The method as claimed in claim 11, wherein comparing the electronic signal and a predetermined value is performed by the control unit.

15. The method as claimed in claim 14, further comprising the control unit, outputting a rotate signal to control the driving module to rotate when the electronic signal is lower than the predetermined value.

16. The method as claimed in claim 15, further comprising the control unit stopping to output the rotate signal when the electronic signal is higher than the predetermined value.

17. The method as claimed in claim 14 or 16, further comprising the control unit, calculating the distance of a target based on the electronic signal received by the receiver when the electronic signal is higher than the predetermined value.

* * * * *